US009973065B2

(12) United States Patent
McAleese et al.

(10) Patent No.: US 9,973,065 B2
(45) Date of Patent: *May 15, 2018

(54) METHOD FOR MANUFACTURING A COIL MODULE FOR A STATOR FOR A TUBULAR LINEAR MOTOR

(71) Applicant: ZiLift Holdings. Ltd., Aberdeen (GB)

(72) Inventors: Alan Charles McAleese, Aberdeen (GB); Richard Edward Clark, Sheffield (GB); Sarah Duggan, Sheffield (GB); Michael Hautop Nielsen, Faaborg (DK)

(73) Assignee: ZiLift Holdings, Ltd., Aberdeen (GB)

( * ) Notice: Subject to any disclaimer, the term of this patent is extended or adjusted under 35 U.S.C. 154(b) by 425 days.

This patent is subject to a terminal disclaimer.

(21) Appl. No.: 14/691,134

(22) Filed: Apr. 20, 2015

(65) Prior Publication Data

US 2015/0288261 A1   Oct. 8, 2015

Related U.S. Application Data

(62) Division of application No. 13/207,901, filed on Aug. 11, 2011, now abandoned.

(51) Int. Cl.
| | |
|---|---|
| *H01F 7/06* | (2006.01) |
| *H02K 15/04* | (2006.01) |
| *H02K 41/02* | (2006.01) |
| *H02K 15/02* | (2006.01) |
| *H02K 41/03* | (2006.01) |
| *H02K 3/52* | (2006.01) |

(52) U.S. Cl.
CPC ........... *H02K 15/045* (2013.01); *H02K 15/02* (2013.01); *H02K 15/04* (2013.01); *H02K 41/02* (2013.01); *H02K 41/03* (2013.01); *H02K 3/521* (2013.01); *Y10T 29/49009* (2015.01)

(58) Field of Classification Search
CPC ...... H02K 41/02; H02K 41/025; H02K 41/03; H02K 41/031; H02K 41/035; H02K 3/521; H02K 15/045; H02K 15/04; H02K 15/02
See application file for complete search history.

(56) References Cited

U.S. PATENT DOCUMENTS 5,831,353 A * 11/1998 Bolding ................ F04B 17/046
                                                          310/12.15
7,752,736 B2 * 7/2010 Pulford, Jr. ............ H02K 15/03
                                                          29/596
(Continued)

*Primary Examiner* — Paul D Kim
(74) *Attorney, Agent, or Firm* — Richard A. Fagin

(57) ABSTRACT

A method for manufacturing a coil module for a stator for a tubular linear motor includes placing a plurality of bobbins and spacers on a winding mandrel and winding the plurality of bobbins with a single length of wire to form a set of coils. Three sets of such coils are interleaved on an encapsulation mandrel. A plurality of metal comb shaped elements, each including a longitudinal spine and a plurality of teeth are distributed about the circumference of the three interleaved sets of coils to form a coil module. The coil module and the mandrel are surrounded with an encapsulation mold. An encapsulating material is introduced into the encapsulation mold. The encapsulated coil module is removed from the encapsulating mold and the encapsulation mandrel after setting of the encapsulating material.

1 Claim, 11 Drawing Sheets

(56) References Cited

U.S. PATENT DOCUMENTS

| | | | |
|---|---|---|---|
| 2005/0006959 A1* | 1/2005 | Hoppe | H02K 41/03 310/12.16 |
| 2014/0070651 A1* | 3/2014 | Gerfast | H02K 21/14 310/114 |
| 2015/0288270 A1* | 10/2015 | McAleese | H02K 41/02 310/12.22 |

* cited by examiner

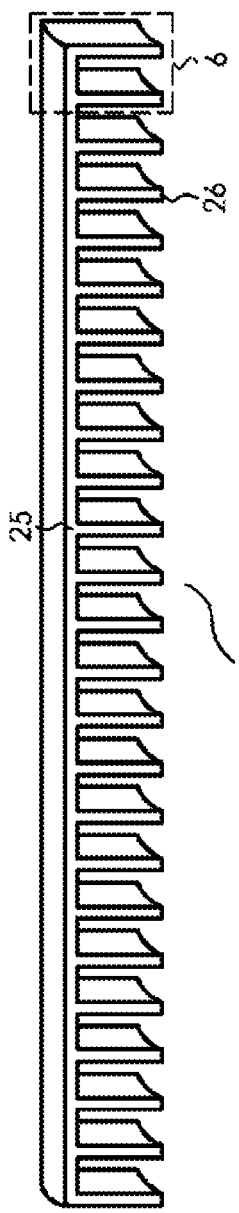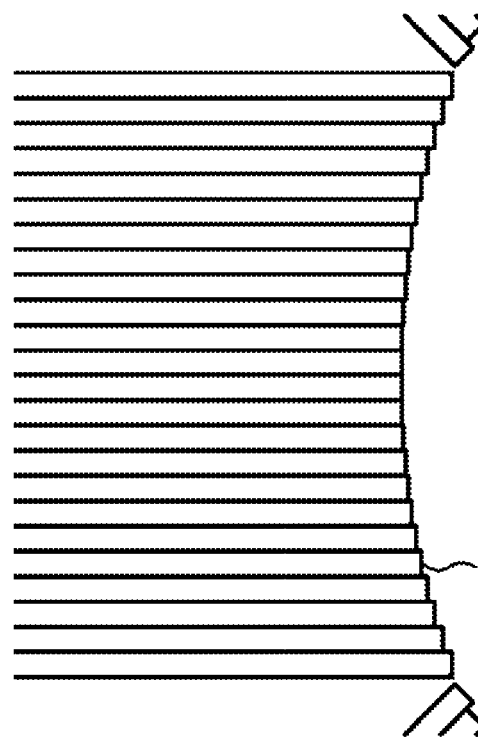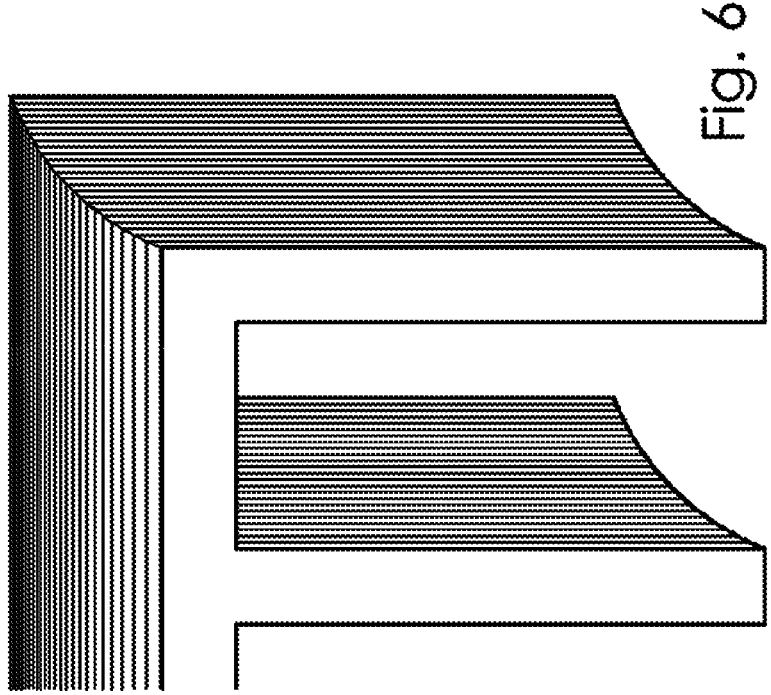

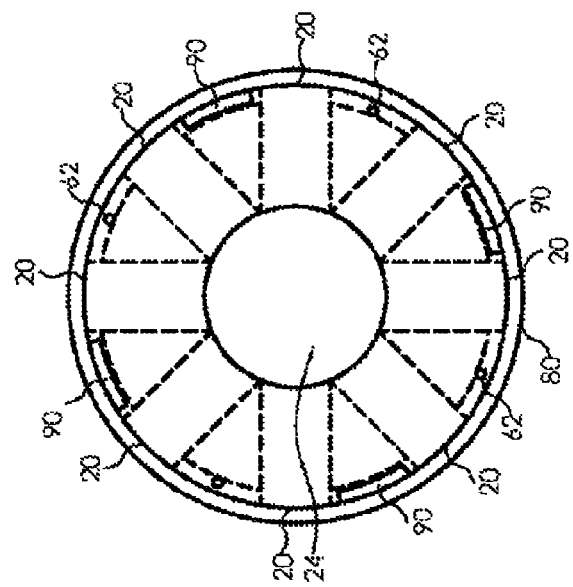
Fig. 25
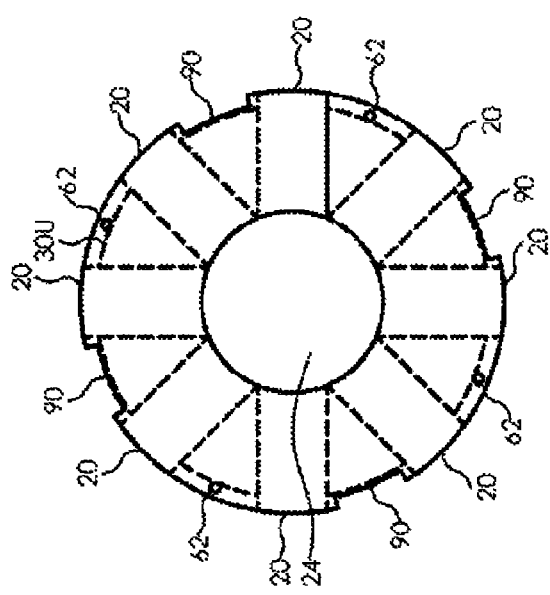
Fig. 24
Fig. 23
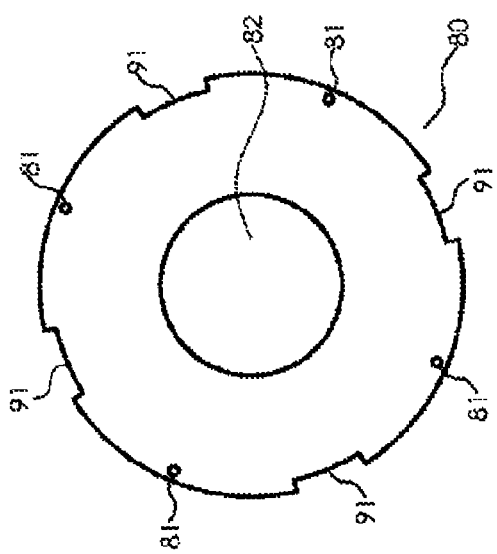

METHOD FOR MANUFACTURING A COIL MODULE FOR A STATOR FOR A TUBULAR LINEAR MOTOR

CROSS-REFERENCE TO RELATED APPLICATIONS

Divisional of U.S. patent application Ser. No. 13/207,901 filed on Aug. 11, 2011, now abandoned.

STATEMENT REGARDING FEDERALLY SPONSORED RESEARCH OR DEVELOPMENT

Not applicable.

THE NAMES OF PARTIES TO A JOINT RESEARCH AGREEMENT

Not Applicable

BACKGROUND

Embodiments described herein generally relate to a tubular linear electric motors, especially such motors in which a relatively long stroke and high linear motive force are desired, such as for use with downhole pumps in wells. The present invention relates to a cost effective modular design and method of constructing long stators having multiple sets of coils for use in applications requiring a rugged and reliable design. In certain embodiments, the stator is made by assembling a multiplicity of identical modules which are combined to form a stator of whatever length may be required. In some embodiments, coil modules containing the coils are connected by intermediate connectors. In those embodiments, the sum of the effective length of the coil module and the effective length of the intermediate connector must be an integral multiple of the pole pitch of the magnets in the motor's mover.

The following descriptions and examples are not admitted to be prior art by virtue of their inclusion in this section. A linear electric motor is an electric motor which produces a linear force along its length. The more common electric motor has a stator, which remains stationary, and a rotor, which rotates and produces a torque. Instead of rotating like the standard electric motor, a linear motor has a stator and a mover which reciprocates along the longitudinal axis of the stator. A tubular electric linear motor typically has a cylindrical housing enclosing a series of ring-shaped coils for generating a variable magnetic field in the hole in the center of the rings. The coils are aligned perpendicularly along a common axis so that the holes through the middle of the coils form a cylindrical passageway along the axis of the stator. The cylindrical mover typically carries an array of permanent magnets on its surface and reciprocates in the passageway along the axis of the stator.

In some linear motors, the roles of the stator and mover are reversed—a cylindrical rod carrying elements which generate a magnetic field is fixed on one or more supports, and an annular element containing axially aligned coils encircles the rod and moves back and forth along the length of the rod.

Linear motors offer potential advantages over other reciprocating machines because of their mechanical simplicity and relatively low friction between the stator and the mover.

Examples of tubular electric linear motors can be found in U.S. Pat. No. 5,276,293 to Narumi et al., U.S. Pat. No. 5,298,819 to Suganuma et al., and U.S. Pat. No. 5,365,131 to Naito et al.

SUMMARY

Certain embodiments of the present invention relate to the design and manufacture of relatively long stators for use in tubular electric linear motors. Depending on the application for the motor, the stator may be required to be relatively long compared to its diameter and contain many sets of coils. This is especially true for tubular electric linear motors in which a relatively long stroke and/or high linear motive force are desired. Certain embodiments of the present invention relate to a cost effective modular design and method of constructing long stators having multiple sets of coils for use in applications requiring a rugged and reliable design. In certain embodiments, the stator is made by assembling a multiplicity of identical modules which are combined to form a stator of whatever length may be required. In some embodiments, coil modules containing the coils are connected by intermediate connectors. To construct stators for linear motors to be powered by three-phase current, the number of coils in each module is a multiple of three. In some embodiments, there are channels in the modules for coolant flow.

BRIEF DESCRIPTION OF THE DRAWINGS

FIG. 1 is an end view looking down the central longitudinal axis of the stator, and FIG. 2 is a cross-sectional view of the stator in FIG. 1 taken along a plane through the central longitudinal axis of the stator.

FIG. 5 is an isometric view of a metal comb-shaped structure used in an embodiment of the invention FIG. 6 is an enlarged view of portion 6 of FIG. 5.

FIG. 7 is an enlarged view of portion 7 of FIG. 3.

FIG. 23 is an end view of an encapsulated stator module having channels for coolant flow used in another embodiment of the invention.

FIG. 24 is an end view of a connector module having channels for coolant flow which may be used with the stator module in FIG. 23.

FIG. 25 is an end view of a stator module having channels for coolant flow inside a cylindrical housing.

DETAILED DESCRIPTION

A detailed description of various embodiments of the invention is provided below along with accompanying figures that illustrate the principles of the invention. The invention is expressly not limited to or by any or all of the embodiments shown or described herein; the scope of the invention is limited only by the claims appended to the end of the issued patent and the invention encompasses numerous alternatives, modifications, and equivalents. Specific details may be set forth in the following description to facilitate a more thorough understanding of the invention. However, such details are provided for the purpose of example and the invention may be practiced according to the claims without some or any of these specific details. In other instances, well-known features and technical material that is known in the technical fields related to the invention may not be described in detail to avoid unnecessarily complicating the description.

Depending on the application, the stator may be required to be relatively long compared to its diameter and contain many sets of coils. Rather than assemble all of the coils to form the stator as a single element, in the present invention the stator is assembled from a set of coil containing modules. It is easier to manufacture each of the coil modules used in the invention, which contains a smaller number of coils than will be in the fully assembled stator, and assemble them to form a relatively long stator than it is to manufacture the stator as a single part. In the event that a coil is defective or fails, the module containing the coil may be replaced rather than having to discard the entire stator.

Many tubular electric linear motors are powered by three phase alternating current. This requires multiple sets of coils in the stator for each of the three phases. Embodiments of the invention in which the number of coils in each module is a multiple of three may be used to assemble a relatively long stator for a tubular electric linear motor powered by three phase alternating current.

Figure 1:
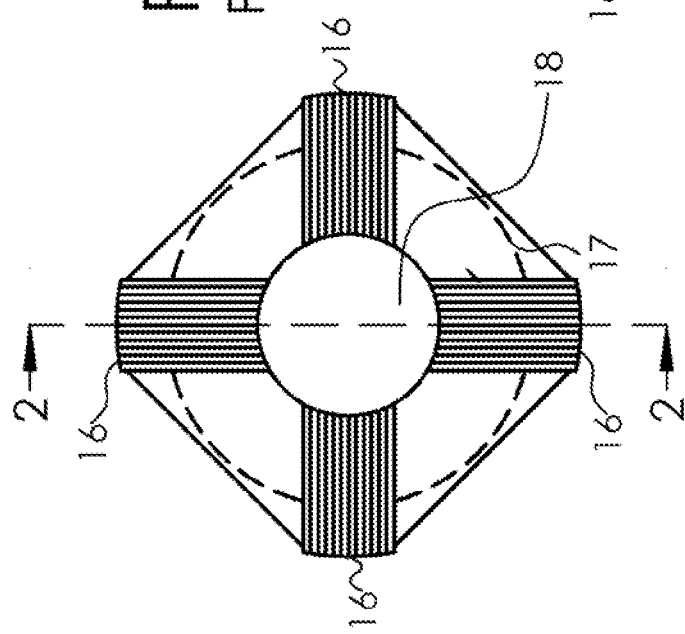
FIGS. 1 and 2 show a stator for a prior art tubular electric linear motor.
Figure 2:
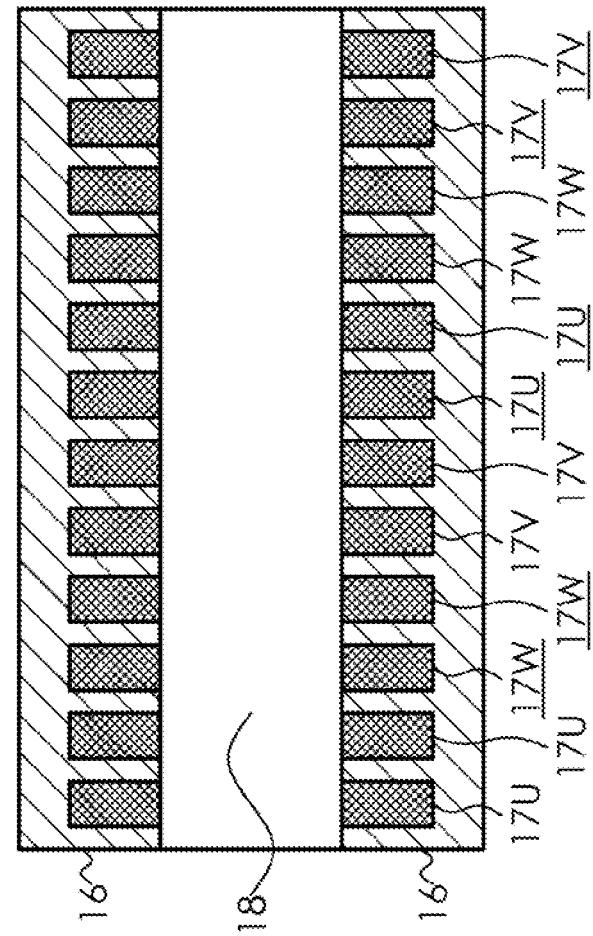

FIGS. 1 and 2 show an example of a prior art design for a stator for a tubular electric linear motor powered by three phase alternating current. The stator 10 has four metal comb-shaped elements 16 arranged in quadrature (each comb-shaped element is rotated 90.degree. with respect to the next comb-shaped element).

The stator also includes a plurality of coils 17, which are arranged perpendicular to, and distributed evenly along, the longitudinal axis of the stator. The circular apertures through the center of each of the coils are aligned to form a central passageway 18. The comb-shaped elements 16 are arranged so that the inner surface of each the comb-shaped element does not intrude into the central passageway 18. The mover (not shown) will reciprocate in the central passageway 18 along the length of the stator 10.

Each of the coils 17 is associated with one of the three phases of the alternating current which powers the motor; by convention, the three phases are referred to using the designations U, V, and W respectively. As shown in FIG. 2, coils powered by phase U of the alternating current are designated 17U, coils powered by phase V of the alternating current are designated 17V, and coils powered by phase W of the alternating current are designated 17W. Underlining is used to indicate that a coil is wound in the opposite direction from a coil having a non-underlined designator—e.g., both coils 17U and 17U are powered by phase U, but coil 17U is wound in the opposite direction as coil 17U. The coils are located between, and spaced apart by, the teeth of the comb-shaped elements 16.

As the stator becomes longer and contains more coils, assembly of the stator becomes increasingly complex and difficult. If the coils are individually wound, then all of the coils for a given phase must be electrically connected in series. Each connection becomes a potential point of failure in the device and may reduce its longevity and reliability in service. The present inventions simplify the manufacture and assembly of the stator for longer stator assemblies, and offer potential increases in longevity and reliability. In addition, the present invention enables or simplifies repair of a stator which fails in service by permitting the replacement of individual modules containing only a portion of the coils in the stator.

In certain embodiments of the invention, the stator is assembled from multiple identical coil modules. In certain embodiments, the stator is assembled by alternating coil modules and intermediate connectors. As explained further below, the axial dimension of the intermediate connector permits the coil modules to retain the same spacing as the magnetic pitch of the mover used with the stator, as explained further below.

Figure 3:
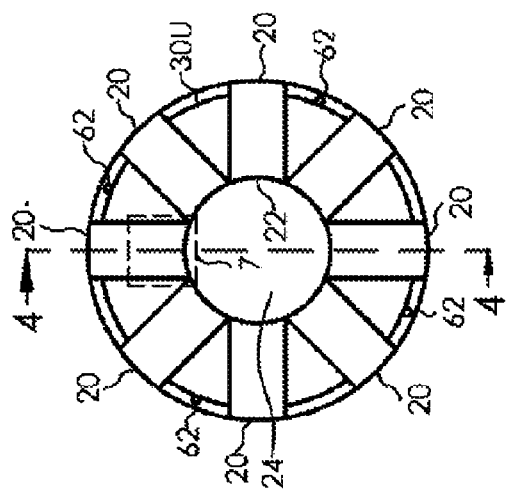
FIG. 3 is a cross-sectional view of an embodiment of the invention taken along a plane which is perpendicular to the central longitudinal axis of the stator as shown in FIG. 4.
Figure 4:
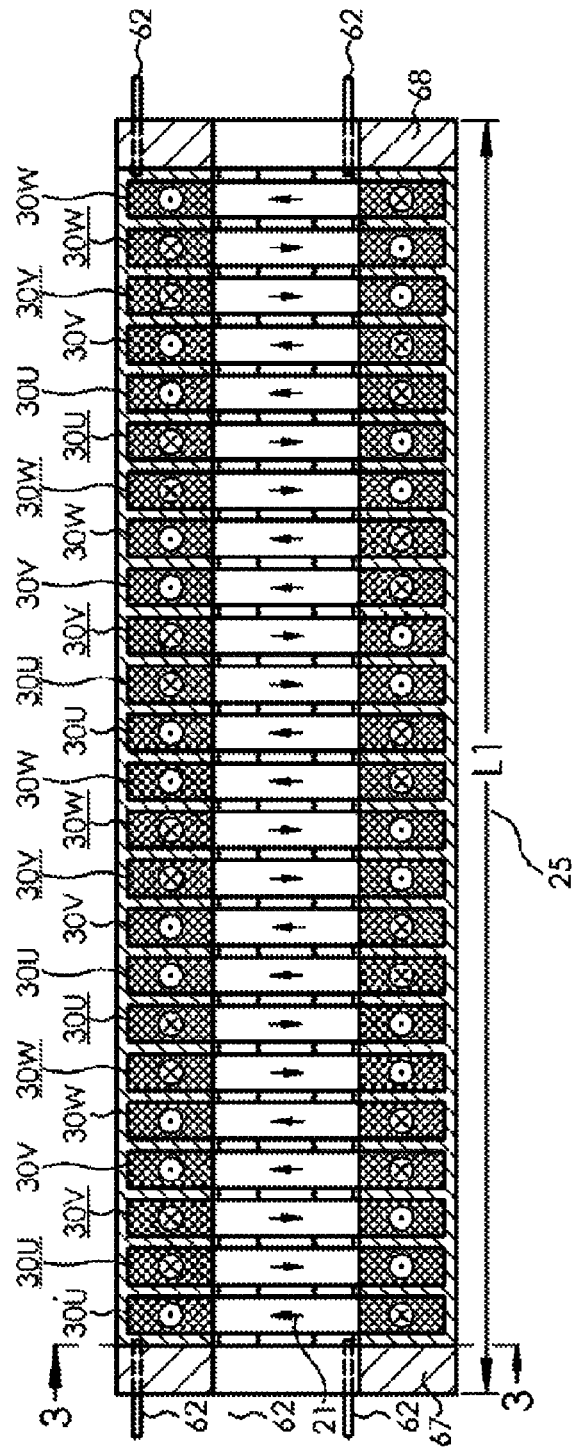
FIG. 4 is a cross-sectional view of the stator module shown in FIG. 3 taken along a plane through the central longitudinal axis of the stator module.

Referring to FIGS. 3 and 4, in one embodiment each coil module 25 is made of eight comb-shaped elements 20 arranged in a starburst pattern and a total of twenty-four ring shaped coils—eight coils 30U are powered by phase U, eight coils 30V are powered by phase V, and eight coils 30W are powered by phase W.

It is understood that each coil module might have a larger or smaller number of comb-shaped elements 20. Having a larger number of combs makes assembly more complicated, but may increase the amount of magnetic material surrounding the coils; having a small number of combs may simplify assembly, but results in less magnetic material surrounding the coils. However, the larger the number of comb-shaped elements, the smaller the spaces between the comb-shaped elements, and those spaces may be used for other functional features, as described below.

Each of the comb-shaped elements 20 has a number of teeth equal to one plus the number of coils in the coil module. As shown in FIG. 3 and discussed in more detail below, the surface 22 of the teeth of each comb-shaped element, when viewed along the longitudinal axis of the comb-shaped element, may have a curved surface, the curve approximating an arc of the circle defining the circumference of the central passageway 24 formed by the surface 22 of the teeth of the comb-shaped elements and the apertures in each of the ring-shaped coils 30.

It also is understood that a module might include a larger or smaller number of coils; the smaller the number of coils in each module, the larger the number of modules that will be required to assemble a stator having a substantial number of coils. In addition, because of the space between the last coil of one module and the first coil of the next module, the smaller the number of coils in each module, the less force per unit length will be able to be generated by the assembled stator because of the increased number of such spaces. However, the smaller the number of coils in each module, the easier and less expensive it will be to construct each module. In the embodiment shown in FIG. 3, twenty-four coils are used in each module; other embodiments of the invention might use 12, 15, 18, 21, or more than 24 coils in each coil module. For tubular electric linear motors powered by three phase current, the number of coils in a module should be a multiple of three and, for reasons explained below, preferably a multiple of six.

In the embodiment shown in FIGS. 3 and 4, the coils are arranged in pairs; each coil has at least one coil adjacent to it which is powered by the same phase of the electric current, but such adjacent coil is wound in the opposite direction (as shown by the arrows 21 indicating the direction in which the coil is wound) to enhance the magnetic field produced by the pair of coils. The direction of the current flow in the windings is indicated by the use of the symbols ⊗ and ●. The symbol ⊗ (circle surrounding an X) indicates that the current is flowing into the page away from the reader in that section of the coil, and the symbol ● (circle surrounding a dot) indicates that the current is flowing out of the page toward the reader in that section of the coil. The coils are arranged in the module in the embodiment shown in FIG. 3 in the following repeating pattern: 30U, <u>30U</u>, <u>30V</u>, 30V, 30W, <u>30W</u>, <u>30U</u>, 30U, 30V, <u>30V</u>, <u>30W</u>, 30W. However, it is understood that other patterns may be used and still take advantage of the use of adjacent paired coils powered by the same phase of the alternating current power source wound in opposite directions.

Referring to FIG. 5, each of the comb-shaped elements 20 in the modules has a longitudinal spine/yoke 25 and a multiplicity of teeth 26.

Typical frequencies for the electric current powering the motor may be of the order of 50-150 Hz. In solid metal structures (which are electrically conducting), this would lead to large induced eddy currents due to the rapidly changing magnetic flux, leading to high energy losses and drag forces resulting in low efficiency. To reduce the eddy currents, the comb-shaped elements 20 have a laminated construction. True radial lamination to give a continuous metal structure along the outside of the module when the combs are assembled would require a wedge shaped cross section for each of the combs; this would require tapered laminations, which are not practical. A radially laminated structure can be approximated by using arrays of stacks of conventional laminations with a layer of insulating material between them. The cross sectional profile for the end of each tooth ideally would be an arc from the circle defining the circumference of the central passageway 24; a close approximation of such an arc can be made by appropriately staggering the laminations within the comb-shaped element 20. Referring to FIGS. 6 and 7, each of the comb-shaped elements 20 is made by laminating a multiplicity of metal comb-shaped sheets 28. The sheets 28 may be coated (at least every other sheet) with an insulating material prior to lamination, or an insulating adhesive may be used to laminate the sheets. In the embodiment shown, there are twenty-four laminations in each comb element; however, it is understood that the number of laminations may vary with the size and the magnetic design of the stator.

Figures 10A, 10B:
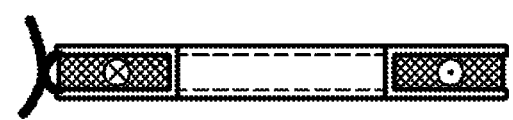
FIG. 10A is a cross sectional view of the bobbin in FIG. 9 after has been wound with wire to form a coil.
FIG. 10B is a cross sectional view of the coil in FIG. 9 after has been rotated 180.degree. about its vertical diametric axis, thereby reversing the direction of the winding of the coil.
Figure 9:
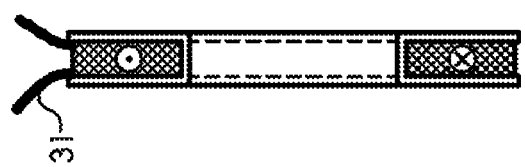
FIG. 9 is a cross-sectional view of the bobbin in FIG. 9 taken along a plane through the central longitudinal axis of the bobbin.
Figure 8:
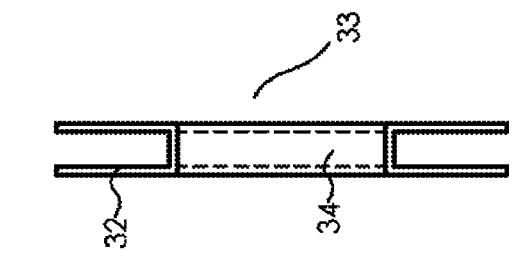
FIG. 8 is a side view of a coil bobbin used in an embodiment of the invention.

Referring to FIGS. 8, 9, and 10A, the coils 30 are made by winding insulated wire 31 in the circumferential groove 32 of a bobbin 33 made of a non-magnetic material. Examples of suitable materials for the bobbin 33 include resins which are good electrical insulators and are capable of withstanding high temperatures, such as PEEK (polyether ether ketone), but it is understood that other non-magnetic materials having suitable strength, high temperature resistance, insulative properties, and cost may be used. The bobbins may be machined or molded depending on factors such as the material to be used, the number to be made, and the cost. Each bobbin 33 has a circular aperture 34 which will define, together with the arcs 22 on the end of each tooth in the comb-shaped elements, the central passage 24 of the stator.

As shown in FIG. 10B, the effective direction in which the coil is wound may be reversed by rotating the coil 180.degree. about the vertical diametric axis of the coil, which, depending on the original configuration of the wires entering and leaving the coil, may cause the wires to cross, as shown in the Figure.

In an embodiment of the invention, all of the coils in a given module which are powered by the same phase of the three phase alternating current power source are wound from a single piece of wire to minimize the number of connections and increase reliability. These coils are "daisy chained" from a single length of wire with no connections. The number of coils daisy chained together and made from a single piece of wire will depend on the design of the module. Eight coils are daisy chained for the twenty-four coil module design shown in FIG. 4, but it is understood that a larger or small number of coils could be made from a single length of wire and daisy chained together depending on the design of the module.

Figure 11:
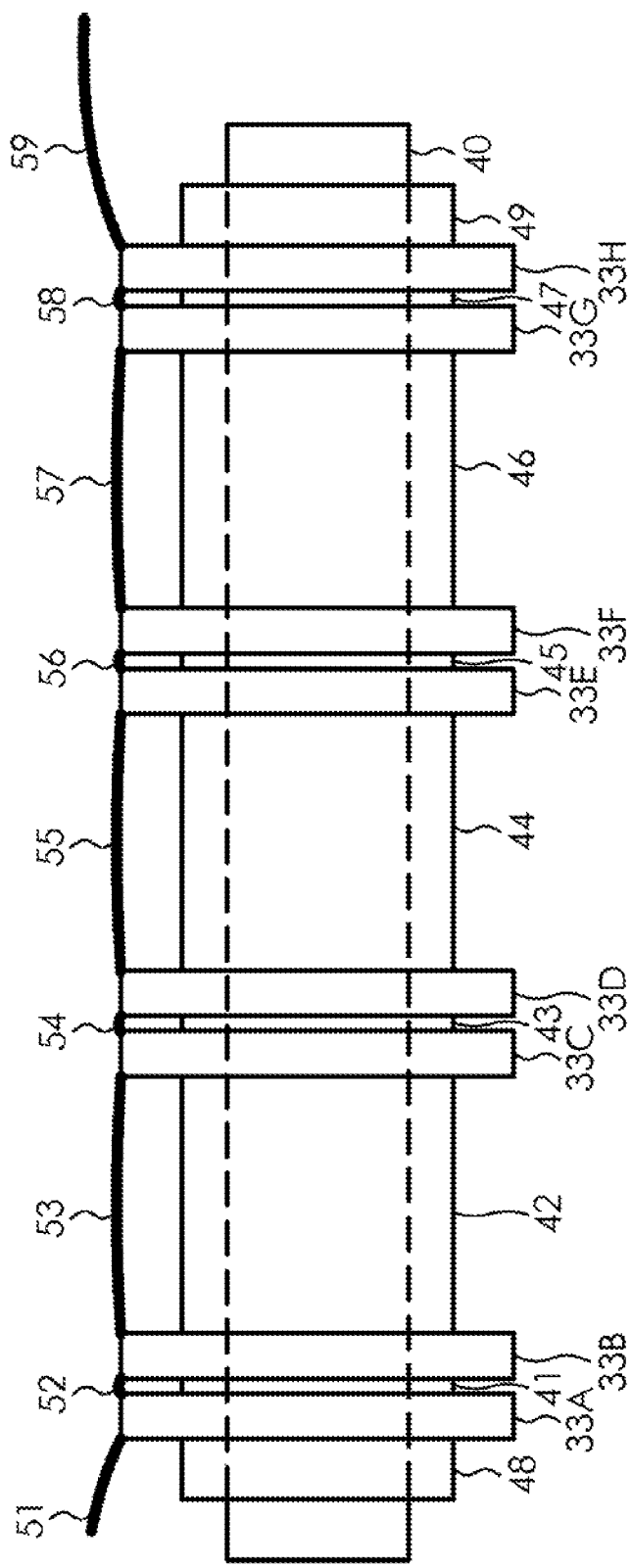
FIG. 11 is a side view of a set of bobbins and spacers on a coil winding mandrel.

Referring to FIG. 11, eight bobbins 33 are loaded onto a cylindrical winding mandrel 40 with ring-shaped spacers 41, 42, 43, 44, 45, 46, and 47 defining the spaces between the bobbins 33 (which become the coils 30 after they have been wound). End collars 48 and 49 maintain the bobbin and spacer assembly on the winding mandrel 40. A single length of wire can then be wound on all eight bobbins (or however many bobbins are required to create the coils powered by the same phase current in the module) sequentially. Starting with end 51 of the wire, the wire is wound in one direction onto bobbin 33A. When the predetermined amount of wire has been wound onto bobbin 33A, the wire goes from bobbin 33A to bobbin 33B at interconnection wire segment 52, and bobbin 33B is wound in the opposite direction. When the predetermined amount of wire has been wound onto bobbin 33B, the wire goes from bobbin 33B to bobbin 33C at interconnection wire segment 53, and bobbin 33C is wound in the same direction as bobbin 33B. When the predetermined amount of wire has been wound onto bobbin 33C, the wire goes from bobbin 33C to bobbin 33D at interconnection wire segment 54, and bobbin 33D is wound in the opposite direction as bobbin 33C. The pattern is repeated for bobbins 33E, 33F, 33G, and 33H. When the predetermined amount of wire has been wound onto bobbin 33H, the wire from bobbin 33H is cut to an appropriate length. The subassembly of eight daisy chained coils is now complete and may be removed from the mandrel 40.

In another embodiment (not shown), the coils may be wound on a mandrel as self-supporting coils without bobbins using, for example, bondable magnet wire.

The pattern of the coils used in the embodiment shown in FIG. 4 permits three similar daisy chained sets of eight coils (one set for each phase of the current) to be used to assemble a module. Two of the sets (Sets A and C in FIG. 14) will be identical, and each of the coils in the other set (Set B in FIG. 14) will be wound opposite its counterpart in the first two sets. Alternatively, Set B may be wound in the same manner as Sets A and C and reversed by turning the entire set 180.degree. after it has been wound (which will effectively reverse the direction of winding of all of the coils in the set). Because all of the coils for a given phase of the current are wound separately from the other phases, the interconnection wire segments for a given phase do not obstruct the winding of the coils for the other phases. When all three phases are wound at the same time, the winding procedure is substantially more complicated because of the potential interference of the interconnection wire segments from different phases.

An alternative method of winding the coils in a set of coils would have all of the coils in any given set wound initially in the same direction, and then each of the coils which needs to be reversed would simply be rotated 180.degree. about its diametrical axis at the point along the circumference where the wire enters and leaves the coil. As shown in FIG. 10B, this effectives reverses the winding of the coil. This would permit the coils in all of three of the sets to be wound initially in the same direction, and then those coils which need to be reversed would simply be rotated as described. This may require that the initial lengths of the interconnection segments be somewhat longer to allow for the twisting of the wire resulting from the rotation of the coil.

Figure 12:
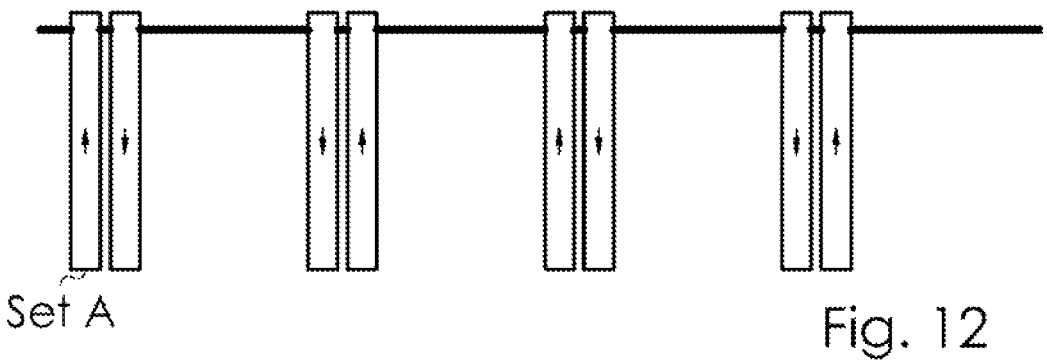
FIGS. 12, 13, and 14 show the assembly of three sets of daisy chained coils to form the set of twenty-four coils used in a coil module in one embodiment of the invention.
Figure 13:
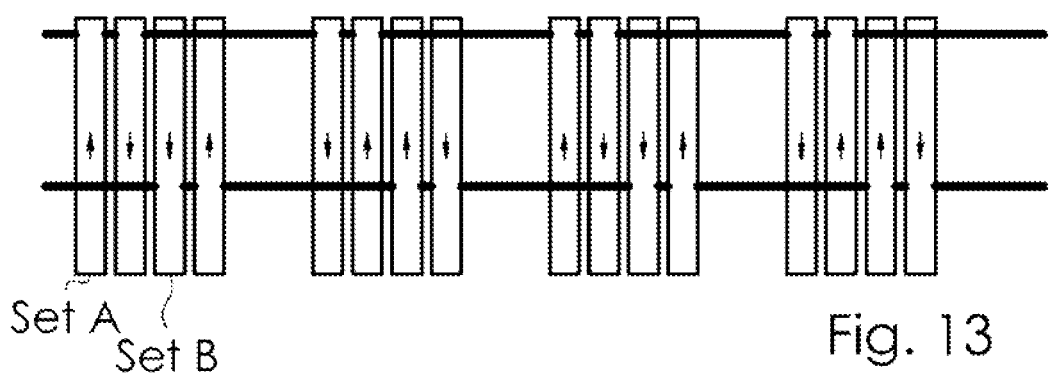
Figure 14:
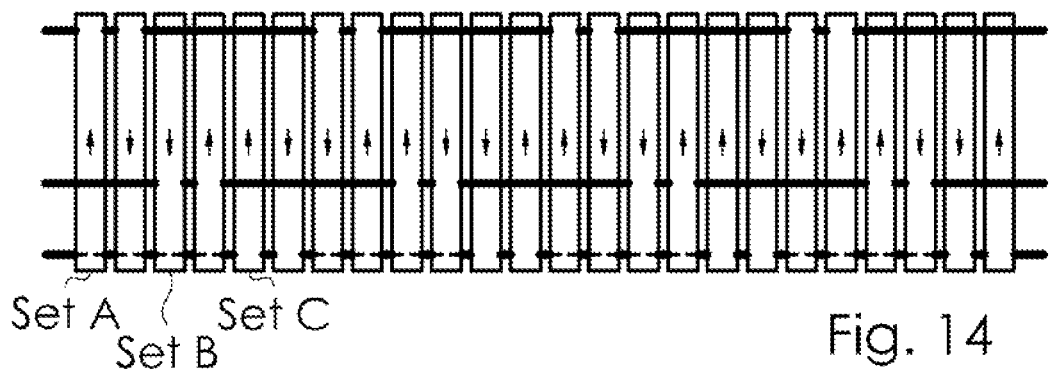
Figure 15:
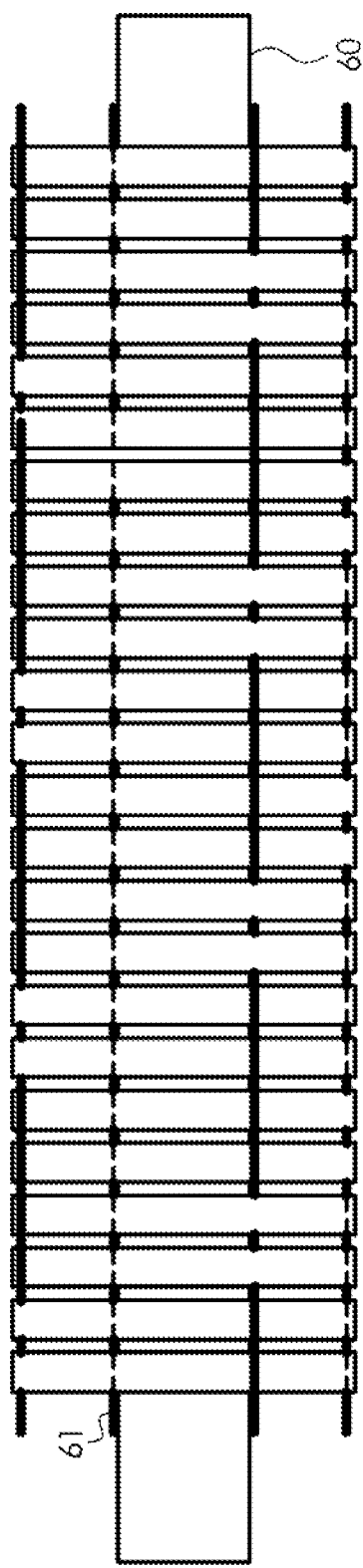
FIG. 15 is a side view of three sets of daisy chained coils mounted on an module assembly mandrel.

Referring to FIGS. 12, 13, and 14, the three sets of daisy chained coils—Set A, Set B, and Set C—can be laid out with each coil in its proper order and the interconnect wire segments laid out more or less in a straight line at different locations about the circumference of the coils. Once the coils and the interconnection wire segments have been laid out as described, the assembly shown in FIG. 14 can be threaded onto a cylindrical module assembly mandrel 60, as shown in FIG. 15. Optionally, one or more temporary spacers (not shown) may be used to maintain appropriate spacing of the coils until the comb-shaped elements 20 are added to the assembled set of coils. As shown in FIG. 15, a fourth wire 61 is added; the wire 61 and the three sets of interconnection wires being arranged in quadrature in the embodiment shown in FIG. 15. The wire 61 serves as the common "neutral" current return line used by all three sets of coils to complete the electrical circuit for each set of coils.

In another embodiment (not shown), a fourth "neutral" wire is not used. In a balanced three-phase system it is not necessary to provide a fourth (neutral) wire. For a 3-wire wye-connected system the ends of the windings are terminated at a common star point at the end of the last module. This has the advantage that the connection to the supply lines is made at the top of the first module and no return conductors are required to pass beside the stator modules. Alternatively, the windings may be configured as a 3-wire delta connected circuit, although this may be less preferable as it requires return conductors.

Figure 16:
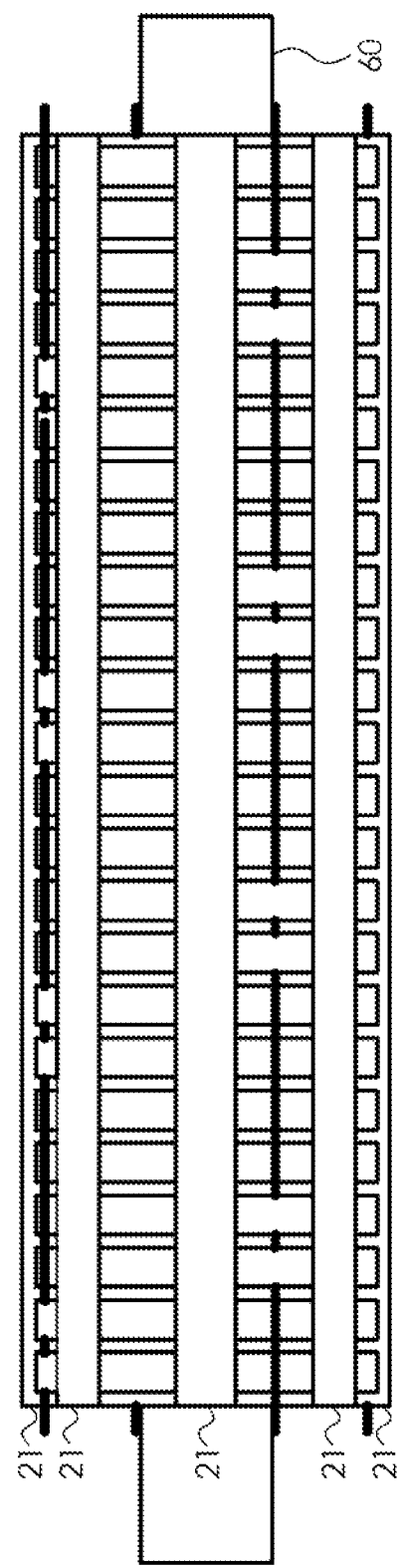
FIG. 16 is a side view of three sets of daisy chained coils mounted on an module assembly mandrel with the set of metal comb-shaped elements used in an embodiment of the invention.

Referring to FIG. 16, the comb-shaped elements 20 are added to the assembly. The teeth of the comb-shaped elements 20 act as spacers for the coils. The placement of the comb-shaped elements 20 is such as to permit the interconnection wire segments and wire 61 to run in the longitudinal spaces between adjacent comb-shaped elements. In the embodiment shown, the three sets of interconnection wire segments and wire 61 are in quadrature, and only every other space between the eight comb-shaped elements is used.

Optionally, as described below, one or more of the remaining spaces between adjacent comb-shaped elements 20 may be used for the formation of coolant paths for cooling the stator when the motor is in operation.

Figure 17:
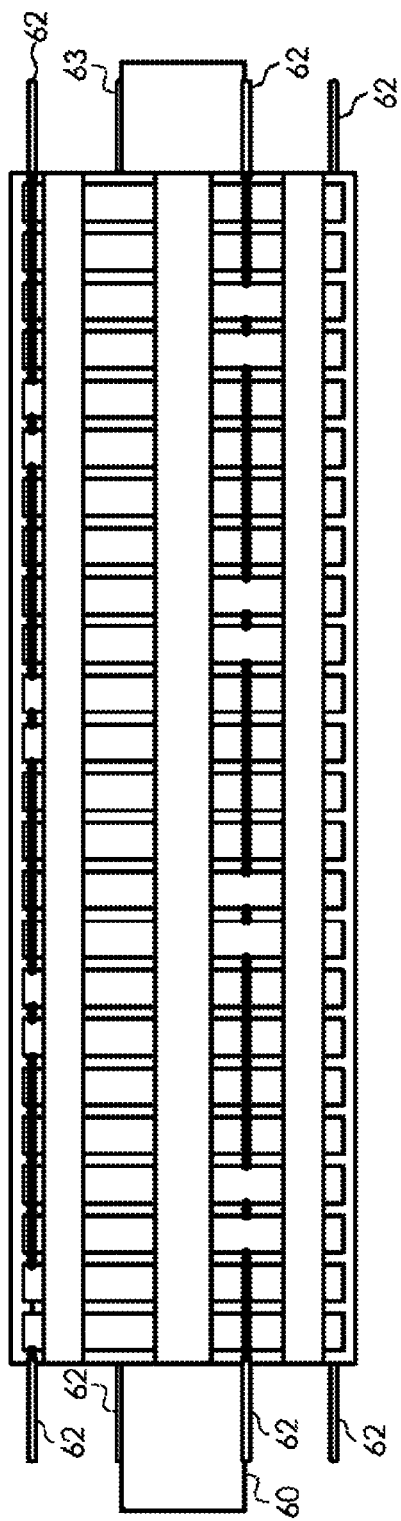
FIG. 17 is a side view of three sets of daisy chained coils mounted on an module assembly mandrel with the set of metal comb-shaped elements used in an embodiment of the invention, with the addition of male connectors for the coil wires used in an embodiment of the invention.

Referring to FIG. 17, the ends of the wires are cut to the final length and may be terminated with male connectors 62, or with flat pads or other suitable connectors that will function to electrically connect the modules when they abut each other when the modules are assembled into a stator.

Figure 18:
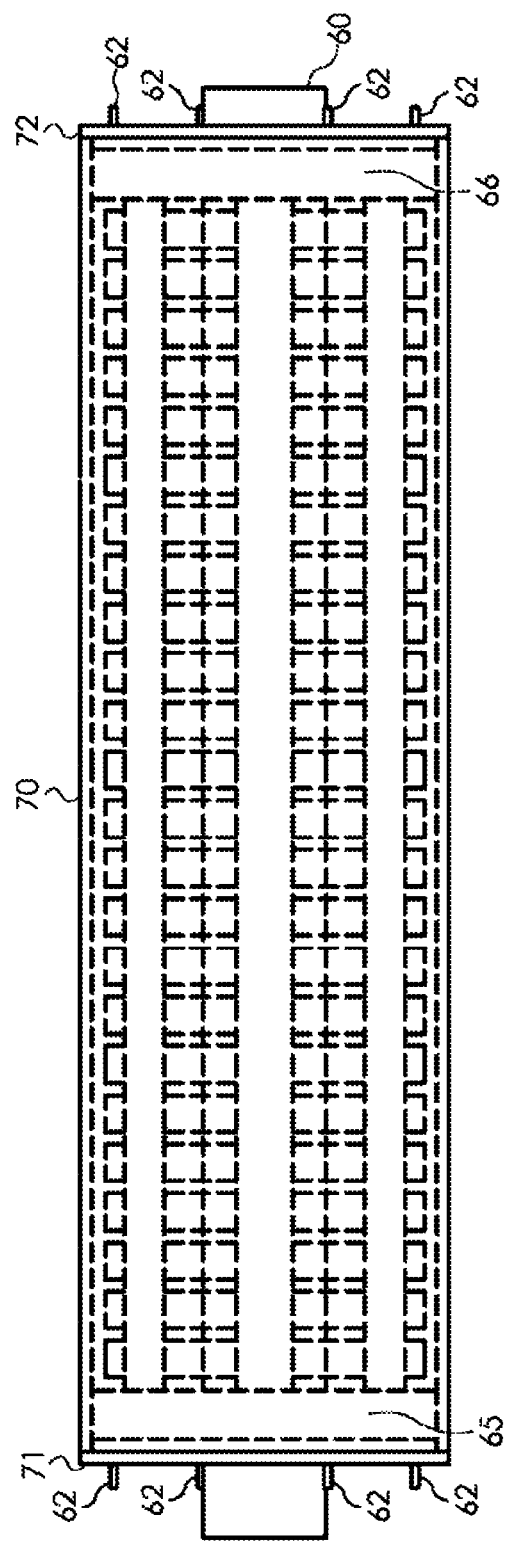
FIG. 18 is a side view of the coils and combs used to make a stator module loaded on an assembly mandrel and in an encapsulation mold assembly used in an embodiment of the invention.

Referring to FIG. 18, a cylindrical outer mold 70 and two end caps 71 and 72 are added to enclose the coil/comb subassembly on the module assembly mandrel 60 and form an encapsulation mold. The end caps 71 and 72 may include apertures for the male connectors 62, assuring proper placement and alignment of the male connectors 62. The mold and end caps may be dimensioned to provide annular cavities 65 and 66 which may be used to adjust the length of the encapsulated module and provide additional support for the male connectors 62.

A suitable encapsulation material is pumped/sucked into the encapsulation mold through ports in the mold (not shown). Examples of encapsulation material might include epoxy or other resins, or any other suitable material which is not electrically conductive (but may be thermally conductive) and which may be made to flow into the encapsulation mold and set or cure after it is in the mold. The encapsulation material fills all of the voids between the components and the mold, including without limitation cavities 65 and 66, which form spacers 67 and 68 in shown in FIG. 4.

Encapsulating the coil/comb subassembly protects the components from the environment in which the motor may be used, improves the mechanical strength of the stator, and, depending on the encapsulation material used, may improve thermal heat paths to cool the coils and the comb-shaped elements.

After the encapsulating material has set, the two end caps 71 and 72, the outer mold 70, and the module assembly mandrel 60 are removed from the completed module. Spacers 67 and 68 shown in FIG. 4, which are formed of encapsulation material, provide support for the male connectors 62, and assure proper alignment of male connectors 62 after the coil module has been removed from the mold.

Referring to FIG. 4, the effective length of the coil module is shown as L1, the distance between the end faces of the module (not counting the protruding pins of the male connectors).

Figure 19:
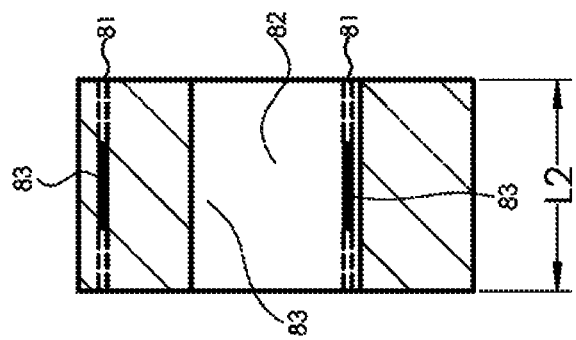
FIG. 19 is an end view of an encapsulated stator module used in an embodiment of the invention.
Figure 20:
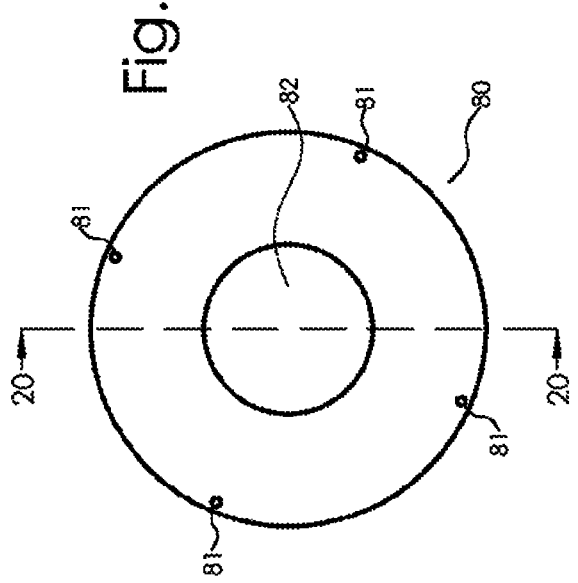
FIG. 20 is a cross sectional view of a connector module used in an embodiment of the invention taken along a plane which is perpendicular to the central longitudinal axis of the connector module.

The stator is assembled by connecting an appropriate number of modules required to provide the required length and power for the stator, and placing the connected assembly inside a cylindrical outer housing of suitable length (not shown). For the embodiment of the coil modules 25 shown in FIG. 4, two coil modules are connected using an intermediate connector 80 such as is illustrated in FIGS. 19 and 20. The intermediate connector 80 may be cylindrical in shape and has a cylindrical axial passageway 82, which has the same diameter as the central passageway 24 in the coil module 25. The intermediate connector 80 also has four pairs of female connectors 81, which are designed to receive and form an electrical connection with the corresponding male connectors 62 found on the coil modules 25. Each of the four pairs of female connectors 81 is electrically connected by jumper 83.

The effective length of the intermediate connector is shown in FIG. 20 as L2, the distance between the end faces of the intermediate connector.

Figure 21:
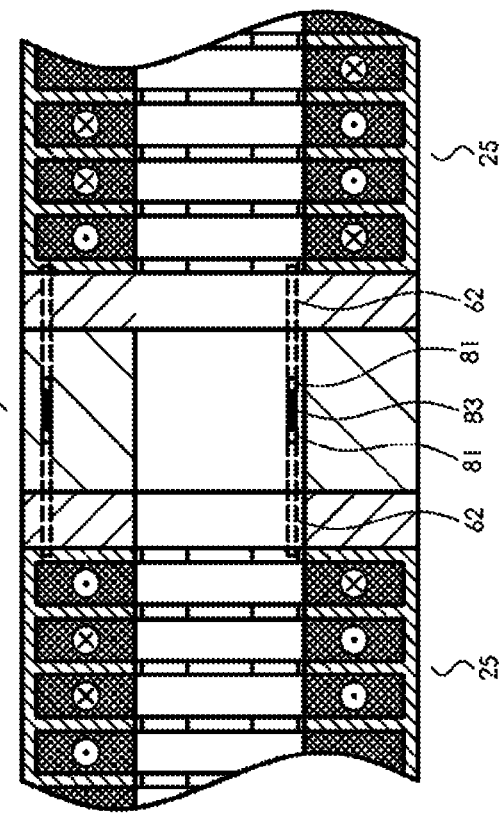
FIG. 21 is a cross sectional view of a connector module and the end portions of two stator modules which it is connecting.

To join two coil modules 25, an intermediate connector 80 is connected at each end to one of the two coil modules 25. As shown in FIG. 21, each of the male connectors 65 in the coil modules 25 is received by a corresponding female connector 81 in the intermediate connector 80, thereby electrically connecting the two coil modules. The intermediate connectors may be molded or machined from a cylindrical rod of material.

Figure 22:
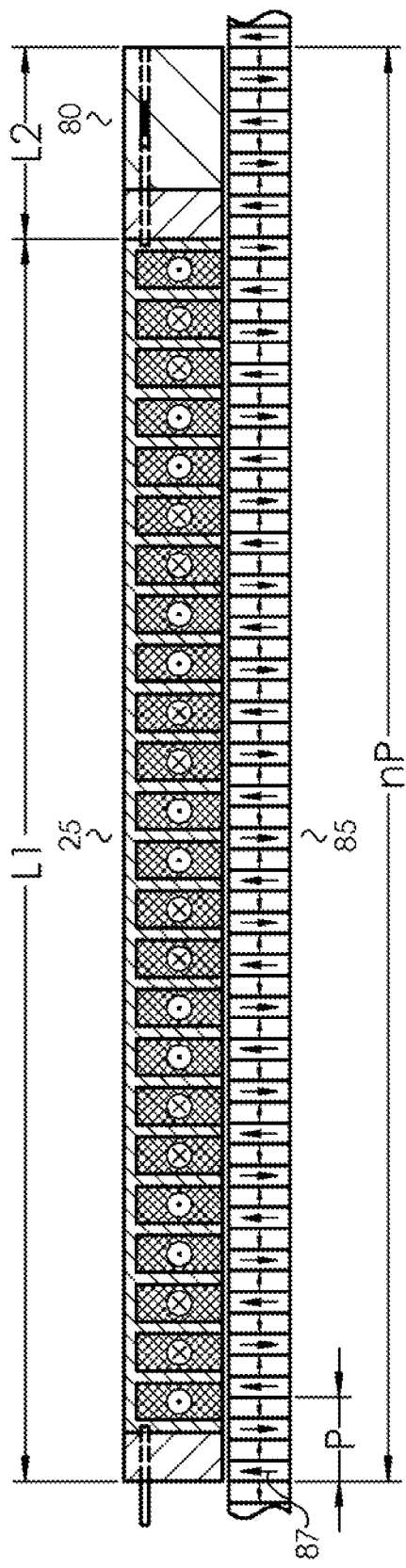
FIG. 22 is a cross section of a portion of an encapsulated stator module, a cross section of a portion of a connector module, and a part of the motor mover which moves longitudinally inside the stator showing the relationship between the pitch of the magnets on the mover and the combined lengths of the stator module and the connector module.

The effective length of the intermediate connector is selected to match the pitch of the coils in the assembled coil modules with the pole pitch of the magnets in the mover. To accomplish this, the sum of the effective length of the coil module and the effective length of the intermediate connector must be an integral multiple of the pole pitch of the magnets in the mover. The pole pitch P of the magnets in the mover 85 is determined by the pattern of the magnets in the mover. As shown in FIG. 22, where the direction of the magnetic field is indicated by arrows 87, the pattern of the magnets in the embodiment of the mover 85 shown for this embodiment repeats over a minimum distance P along the length of the mover. This distance is referred to as the "pole pitch" of the mover. The combined lengths of the coil module and the intermediate connector (not counting the length of the male connectors which may be protruding from either the coil module or the intermediate connector) most preferably is an integer multiple of the pole pitch of the mover, or L1+L2=nP, where n is an integer. In the embodiment shown in FIG. 22, the combined length of the coil module 25 and the intermediate connector 80 is 17 times the pole pitch of the mover.

When the spaces between adjacent comb-shaped elements are used for the formation of coolant paths, corresponding passageways must be provided in the intermediate connector to connect the coolant paths of the coil modules on either side of the intermediate connector. Referring to FIGS. 23 and 24, the coil module may contain one or more grooves 90 extending in a longitudinal direction and the intermediate connectors may include a corresponding number of longitudinal groove 91. The grooves 90 and 91 in the coil modules and the intermediate connectors, respectively, form coolant passageways along the length of the stator when the coil modules and the intermediate connectors are assembled and placed inside a cylindrical housing, as shown in FIG. 25. The grooves may be formed when the modules or intermediate connectors are encapsulated or molded, or may be machined after encapsulation or molding.

In another embodiment (not shown) the need for intermediate connectors may be obviated by integrating the function of intermediate connector into the coil module. This may be done by using female connectors instead of male connectors on one end of the coil module and dimensioning the axial lengths of the spacers 67 and 68 to maintain the effective length of the coil module as an integer multiple of the pole pitch of the magnets on the mover. In this manner, two coil modules may be joined without the need for an intermediate connector while maintaining the effective length of the module as an integer multiple of the pole pitch of the magnets in the mover.

It is understood that other electrical connectors may be used instead of the male and female connectors described above, provided that they mate in an appropriate fashion when the modules are assembled.

End caps (not shown) are added to each end of the housing to seal the unit and hold the coil modules and modules in place. At least one of the end caps includes electrical connectors to permit the stator to be connected to a three phase alternating current power supply for the coils in the stator.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for manufacturing an encapsulated coil module for a stator for a tubular linear motor, comprising:
  placing a first plurality of bobbins and spacers on a winding mandrel, the bobbins in the first plurality of bobbins spaced apart along the winding mandrel;
  winding said first plurality of bobbins with a single length of wire to form a first set of coils;
  placing at least a second set of bobbins and spacers and a third set of bobbins and spacers on the winding mandrel;
  winding each of the second set of bobbins and the third set of bobbins with a respective single length of wire to form a second set of coils and a third set of coils;
  interleaving said said first, said second and said third sets of coils on an assembly mandrel;
  distributing a plurality of metal comb shaped elements, each of said comb shaped elements comprising a longitudinal spine and a plurality of teeth, about the circumference of said interleaved at least first, second and third sets of coils to form a coil module;
  surrounding said coil module and said assembly mandrel in an encapsulation mold;
  introducing an encapsulation material into said encapsulation mold to encapsulate said coil module in said encapsulation material; and
  removing said coil module from said encapsulation mold and said assembly mandrel after setting of said encapsulation material.

* * * * *